US006387248B2

(12) United States Patent
Sherwood, Jr. et al.

(10) Patent No.: US 6,387,248 B2
(45) Date of Patent: *May 14, 2002

(54) METHOD OF PREPARING A CATALYST FOR USE IN THE HYDROTREATING OF HIGH BOILING HYDROCARBON FEEDSTOCKS

(75) Inventors: David Edward Sherwood, Jr., Beaumont; Pei-Shing Eugene Dai, Port Arthur, both of TX (US)

(73) Assignee: Texaco Inc., White Plains, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/965,261

(22) Filed: Nov. 6, 1997

(51) Int. Cl.$^7$ ............................ C10G 45/04; B01J 23/84
(52) U.S. Cl. ............................ 208/216 PP; 208/251 H; 208/254 H; 208/112; 502/313; 502/314; 502/315; 502/316; 502/439; 502/506; 502/523
(58) Field of Search ..................... 208/216 PP, 251 H, 208/254 H, 112; 502/313, 314, 315, 316, 439, 506, 523

(56) References Cited

U.S. PATENT DOCUMENTS

| | | | | |
|---|---|---|---|---|
| 3,020,244 A | * | 2/1962 | Dienes ..................... 502/309 |
| 3,629,698 A | | 12/1971 | Lamb ..................... 324/58.5 B |
| 3,692,698 A | | 9/1972 | Riley et al. ................. 252/439 |
| 3,692,858 A | * | 9/1972 | Brewer et al. ............... 585/241 |
| 3,770,617 A | | 11/1973 | Riley et al. ................. 208/216 |
| 3,876,523 A | | 4/1975 | Rosinski et al. .............. 208/89 |
| 3,935,127 A | * | 1/1976 | Conway ..................... 502/314 |
| 3,956,105 A | * | 5/1976 | Conway ..................... 208/111.3 |
| 4,048,060 A | | 9/1977 | Riley ....................... 208/210 |
| 4,051,021 A | | 9/1977 | Hammer ..................... 208/216 |
| 4,066,574 A | | 1/1978 | Tamm ....................... 252/439 |
| 4,082,695 A | | 4/1978 | Rosinski et al. ............. 252/465 |
| 4,089,774 A | | 5/1978 | Oleck et al. ................ 208/89 |
| 4,098,683 A | * | 7/1978 | Conway ..................... 208/216 |
| 4,297,242 A | | 10/1981 | Hensley, Jr. et al. ......... 252/439 |
| 4,305,965 A | | 12/1981 | Cheney ..................... 426/104 |
| 4,306,965 A | | 12/1981 | Hensley, Jr. et al. ......... 208/216 |
| 4,309,278 A | | 1/1982 | Sawyer ..................... 208/111 |
| 4,309,378 A | | 1/1982 | Ganster et al. .............. 264/311 |
| 4,328,127 A | | 5/1982 | Angevine et al. ............ 252/439 |
| 4,341,625 A | | 7/1982 | Tamm ....................... 208/216 |
| 4,395,328 A | | 7/1983 | Hensley, Jr. et al. ......... 208/251 |
| 4,395,329 A | | 7/1983 | LePage et al. .............. 208/251 |
| 4,443,558 A | * | 4/1984 | Gibson ..................... 502/314 |
| 4,652,545 A | | 3/1987 | Lindsley et al. ............. 502/255 |
| 4,738,944 A | | 4/1988 | Robinson et al. ............ 502/211 |
| 4,746,419 A | | 5/1988 | Peck et al. ................. 208/213 |
| 4,941,964 A | | 7/1990 | Dai et al. .................. 208/216 |
| 5,008,003 A | * | 4/1991 | Smegal et al. .............. 208/254 H |
| 5,047,142 A | | 9/1991 | Sherwood, Jr. et al. ....... 208/251 |
| 5,190,642 A | * | 3/1993 | Wilson et al. .............. 208/254 R |
| 5,221,656 A | | 6/1993 | Clark et al. ................ 502/315 |
| 5,399,259 A | | 3/1995 | Dai et al. .................. 208/216 |
| 5,435,908 A | * | 7/1995 | Nelson et al. ............. 208/216 PP |
| 5,514,273 A | | 5/1996 | Sherwood, Jr. et al. ....... 208/216 |

OTHER PUBLICATIONS

Van Kerkvoort, W.J.; Nieuwstad, A.J.J.; Determination of Dry Sludge Content of Fuel Oils; Development of the Shell Hot Filtration Test, vol. 37, No. 333 Journal of the Institute of Petroleum, Sep. 1951, pp. 596–604.

* cited by examiner

Primary Examiner—Walter D. Griffin
(74) Attorney, Agent, or Firm—Morris N. Reinisch; Howrey Simon Arnold & White

(57) ABSTRACT

A catalyst characterized by its ability to hydrotreat a charge hydrocarbon feed containing components boiling above 1000° F., and sediment-formers, sulfur, metals, asphaltenes, carbon residue, and nitrogen is prepared by mulling a porous alumina support with a salt of a Group VIII metal oxide and with a salt of a Group VI-B metal oxide in the presence of an acid to provide a mixture, by extruding the mixture to form an extrudate, by drying the extrudate and by subjecting the dried extrudate to hydrothermal calcination to provide the catalyst.

19 Claims, No Drawings

METHOD OF PREPARING A CATALYST FOR USE IN THE HYDROTREATING OF HIGH BOILING HYDROCARBON FEEDSTOCKS

TECHNICAL FIELD OF THE INVENTION

This application is directed to a novel method of preparing and using catalysts. The catalysts are prepared by mulling a porous alumina support with a salt of a Group VIII metal and with a salt of a Group VI-B metal in the presence of an acid to provide a mixture, extruding the mixture to form an extrudate, drying the extrudate and subjecting the dried extrudate to hydrothermal calcination to provide the catalyst.

BACKGROUND OF THE INVENTION

It is known to convert heavy hydrocarbons, such as those having a boiling point above about 1000° F., such as petroleum residues into lighter hydrocarbons which are characterized by higher economic value through hydrodesulfurization (HDS), hydrodenitrogenation (HDN), carbon residue reduction (CRR), and hydrodemetallation (HDM)—the latter particularly including removal of nickel compounds (HDNi) and vanadium compounds (HDV).

These processes typically employ hydrotreating catalysts with specified ranges of pores having relatively small diameters (i.e., micropores) and pores having relatively large diameters (i.e., macropores). Thus, U.S. Pat. No. 5,399,259 and U.S. Pat. No. 5,435,908 disclose catalysts comprising a porous alumina support bearing 3–6 w % of Group VIII metal oxide, 14.5–24 w % of Group VI-B metal oxide, and 0–6 w % of phosphorus oxide, characterized by a Total Surface Area of 165–230 m$^2$/g, Total Pore Volume of 0.5–0.8 cc/g, and a Pore Size Distribution (PSD) whereby less than about 5% of Total Pore Volume (TPV) is present as primary micropores of diameter less than about 80 Å and at least about 65% of the TPV is present as secondary micropores of diameter of ±20 Å of a Pore Mode of about 100–135 Å and about 22–29% of the TPV is present as macropores of diameter ≧250 Å.

The catalysts disclosed in theses patents are prepared by mulling an alumina powder and extruding it to form a support, calcining the support, impregnating the calcined support with the catalytic metals salts and recalcining the impregnated support.

FIELD OF THE INVENTION

This invention relates to a novel method of preparing catalysts and using the catalysts in converting heavy hydrocarbons. The catalysts of the present invention are prepared by mulling the salts of Group VIII, Group VI-B metals with an alumina powder, followed by extrusion and calcination, and have less than 5% of the Group VIII metal oxide in an acid extractable form; the catalyst comprising a porous alumina support containing 3–6 w % of Group VIII metal oxide, 14.5–24 w % of Group VI-B metal oxide, and 0–6 w % of phosphorus oxide, characterized by a Total Surface Area of 165–230 m$^2$/g, Total Pore Volume of 0.81–0.98 cc/g, and a Pore Diameter Distribution whereby 22.0–36.0% of the Total Pore Volume is present as macropores of a diameter greater than 250 Å, 64.0–78.0% of the Total Pore Volume is present as micropores of a diameter of less than 250 Å, greater than 60% of the micropore volume is present as micropores of diameter ±25 Å about a pore mode by volume of 100–120 Å, and less than 0.05 cc/g of micropore volume is present in micropores with diameters less than 80 Å.

The method of the present invention does away with the steps of U.S. Pat. No. 5,399,259 and U.S. Pat. No. 5,435,908 that require impregnating the calcined support with the catalytic metals and with the recalcining of the impregnated support.

Since the catalysts of the instant invention are not impregnated, they do not have many of the characteristics of impregnated catalysts. Indeed, the catalysts of the instant invention typically have HDS-MAT C 0.5g @ 550° F. values of only 10–30 and HDS-MAT relative k values of only 0.05 to 0.30.

PRIOR ART

U.S. Pat. No. 5,047,142 (Dai et al.) discloses a catalyst composition useful in the hydroprocessing of a sulfur and metal-containing feedstock comprising an oxide of nickel or cobalt and an oxide of molybdenum on a porous alumina support in such a manner that the molybdenum gradient of the catalyst has value of less than 6.0 and 15–30% of the nickel or cobalt is in an acid extractable form, and having a surface area of 150–210 m$^2$/g, a Total Pore Volume (TPV) of 0.50–0.75 cc/g, and a pore size distribution such that less than 25% TPV is in pores having diameters of less than 100 Å, 70.0–85.0% TPV is in pores having diameters of 100 Å–160 Å and 1.0–15.0% TPV is in pores having diameters of greater than 250 Å.

U.S. Pat. No. 4,941,964 (Dai et al.) discloses a process for the hydrotreatment of a sulfur and metal-containing feed which comprises contacting said feed with hydrogen and a catalyst in a manner such that the catalyst is maintained at isothermal conditions and is exposed to a uniform quality of feed, the catalyst comprising an oxide of a Group VIII metal, an oxide of a Group VI-B metal and 0–2.0 w % of an oxide of phosphorus on a porous alumina support, and having a surface area of 150–210 m$^2$/g and a Total Pore Volume (TPV) of 0.50–0.75 cc/g such that 70–85% TPV is in pores having diameters of 100 Å160 Å and 5.5–22.0% TPV is in pores having diameters of greater than 250 Å.

U.S. Pat. No. 4,738,944 (Robinson et al.) discloses a catalyst composition useful in the hydrotreatment of hydrocarbon oils, the catalyst containing nickel and phosphorus and about 19–21.5% Mo (calculated as the oxide) on a porous refractory oxide, having a narrow pore size distribution wherein at least 10% TPV is in pores having diameters less than 70 Å, at least 75% TPV is in pores having diameters between 50–110 Å, at least 60% TPV is in pores having diameters within about 20 Å above and below the average pore diameter; and at most 25% TPV, most preferably less than 10% TPV, is in pores having diameters greater than 110 Å.

U.S. Pat. No. 4,652,545 (Lindsley et al.) discloses a catalyst composition useful in the hydroconversion of heavy oils, the catalyst containing 0.5–5% Ni or Co and 1.8–18% Mo (calculated as the oxides) on a porous alumina support, having 15–30% of the Ni or Co in an acid extractable form, and further characterized by having a Total Pore Volume (TPV) of 0.5–1.5 cc/g with a pore diameter distribution such that (i) at least 70% TPV is in pores having 80–120 Å diameters, (ii) less than 0.03 cc/g of TPV is in pores having diameters of less than 80 Å, and (iii) 0.05–0.1 cc/g of TPV is in pores having diameters of greater than 120 Å.

U.S. Pat. No. 4,395,328 (Hensley, Jr. et al.) discloses a process for the hydroconversion of a hydrocarbon stream containing asphaltenes and a substantial amount of metals, comprising contacting the stream (in the presence of hydrogen) with a catalyst present in one or more fixed or ebullating beds, the catalyst comprising at least one metal which may be a Group VI-B or Group VIII metal, an oxide of phosphorus, and an alumina support, where the alumina support material initially had at least 0.8 cc/gm of TPV in pores having diameters of 0–1200 Å, and at least 0.1 cc/gm of TPV is in pores having diameters of 1200–50,000, and the support material was heated with steam to increase the average pore diameter of the catalyst support material.

U.S. Pat. No. 4,341,625 (Tamm) discloses a process for hydrodesulfurizing a metal-containing hydrocarbon feedstock which comprises contacting the feedstock with a catalyst comprising at least one hydrogenation agent (i.e., Group VI-B or Group VIII metal or combinations thereof) on a porous support, the catalyst being further characterized by having a TPV of 0.5–1.1 cc/g with at least 70% TPV in pores having diameters of 80–150 Å and less than 3% TPV in pores having diameters greater than 1000 Å.

U.S. Pat. No. 4,328,127 (Angevine et al.) discloses a catalyst composition for use in the hydrodemetallation-desulfurization of residual petroleum oils, the catalyst comprising a hydrogenating component (i.e., Group VI-B or Group VIII metal, or combinations thereof) on a porous support, and being further characterized by having a TPV of 0.45–1.5 cc/g with 40–75% TPV in pores having diameters of 150–200 Å, and up to 5% TPV in pores having diameters of greater than 500 Å.

U.S. Pat. No. 4,309,278 (Sawyer) discloses a process for the hydroconversion of a hydrocarbon feedstock comprising contacting the feedstock with hydrogen and a catalyst in a fixed bed, moving bed, ebullating bed, slurry, disperse phase, or fluidized bed reactor, where the catalyst comprises a hydrogenation component (i.e., Group VI-B or Group VIII metal) on a porous support, and is further characterized by having a TPV of 1.0–2.5 cc/g with no more than 0.05–0.20 cc/g of TPV in pores having diameters of greater than 400 Å.

U.S. Pat. No. 4,305,965 (Hensley, Jr. et al.) discloses a process for the hydrotreatment of a hydrocarbon stream comprising contacting the stream with hydrogen and a catalyst, the catalyst comprising chromium, molybdenum, and at least one Group VIII metal on a porous support, and further characterized by having a TPV of 0.4–0.8 cc/g with 0–50% TPV in pores having diameters smaller than 50 Å, 30–80% TPV in pores having diameters of 50–100 Å, 0–50% TPV in pores having diameters of 100–150 Å, and 0–20% TPV in pores having diameters greater than 150 Å.

U.S. Pat. No. 4,297,242 (Hensley, Jr. et al.) discloses a 2-stage process for the catalytic hydrotreatment of hydrocarbon streams containing metal and sulfur compounds, the process comprising: (i) first contacting the feedstock with hydrogen and a demetallation catalyst comprising a Group VI-B and/or Group VIII metal; and (ii) thereafter reacting the effluent with a catalyst consisting essentially of at least one Group VI-B metal on a porous support, and having a TPV of 0.4–0.9 cc/g and a pore size distribution such that pores having diameters of 50–80 Å constitute less than 40% TPV, pores having diameters of 80–100 Å constitute 15–65% TPV, pores having diameters of 100–130 Å constitute 10–50% TPV, and pores having diameters of greater than 130 Å less than 15% TPV.

U.S. Pat. No. 4,089,774 (Oleck et al.) discloses a process for the demetallation and desulfurization of a hydrocarbon oil comprising contacting the oil with hydrogen and a catalyst, the catalyst comprising a Group VI-B metal and an iron group metal (i.e., iron, cobalt, or nickel) on a porous support, and having a surface area of 125–210 m$^2$/g and TPV of 0.4–0.65 cc/g with at least 10% TPV in pores having diameters less than 30 Å, at least 50% of pore volume accessible to mercury being in pores having diameters of 30–150 Å, and at least 16.6% of pores accessible to mercury being in pores having diameters greater than 300 Å.

U.S. Pat. No. 4,082,695 (Rosinski et al.) discloses a catalyst for use in the demetallation and desulfurization of petroleum oils, the catalyst comprising a hydrogenating component (i.e., cobalt and molybdenum) on a porous support, and having a surface area of 110–150 m$^2$/g and a pore size distribution such that at least 60% of TPV is in pores having diameters of 100–200 Å and not less than 5% TPV is in pores having diameters greater than 500 Å.

U.S. Pat. No. 4,066,574 (Tamm) discloses a catalyst composition useful in the hydrodesulfurization of a hydrocarbon feedstock containing organometallic compounds, the catalyst comprising Group VI-B and Group VIII metal components on a porous support, and having a TPV of 0.5–1.1 cc/g with a pore diameter distribution such that at least 70% TPV is in pores of diameters of 80–150 Å and less than 3% TPV is in pores having diameters greater than 1000 Å.

U.S. Pat. No. 4,051,021 (Hamner) discloses a catalytic process for the hydrodesulfurization of a hydrocarbon feed which comprises contacting the feed with hydrogen and a catalyst, the catalyst comprising a Group VI-B and Group VIII metal on a porous support, and having a TPV of 0.3–1.0 cc/g with a pore diameter distribution such that greater than 50% TPV is in pores of diameters of 70–160 Å, and pores having diameters below 70 Å and above 160 Å are minimized.

U.S. Pat. No. 4,048,060 (Riley) discloses a two-stage process for hydrodesulfurizing a heavy hydrocarbon feed which comprises: (i) contacting the feed with hydrogen and a first catalyst to produce a first hydrodesulfurized hydrocarbon product, the first catalyst comprising a Group VI-B and Group VIII metal on a porous support and having a mean pore diameter of 30–60 Å; and (ii) contacting the first hydrodesulfurized hydrocarbon product with hydrogen and a second catalyst under hydrodesulfurization conditions, the second catalyst comprising a Group VI-B and Group VIII metal on a porous support and being further characterized by having a TPV of 0.45–1.50 cc/g with 0–0.5 cc/g of TPV in pores having diameters greater than 200 Å, 0–0.05 cc/g of TPV in pores having diameters below 120 Å, and at least 75% TPV in pores having diameters ±10 Å of a mean pore diameter of 140–190 Å.

U.S. Pat. No. 3,876,523 (Rosinski et al.) discloses a process f or the demetalizing and desulfurizing of residual petroleum oil comprising contacting the oil with hydrogen and a catalyst, the catalyst comprising a Group VI-B and Group VIII metal on a porous support and having a pore size distribution such that greater than 60% TPV is in pores having diameters of 100–200 Å, at least 5% TPV is in pores having diameters greater than 500 Å, and 10% TPV or less is in pores having diameters less than 40 Å, and the surface area of the catalyst is 40–150 m$^2$/g.

U.S. Pat. No. 3,770,617 (Riley et al.) discloses a process for the desulfurization of a petroleum hydrocarbon feed comprising contacting the feed with hydrogen and a catalyst, the catalyst comprising a Group VI-B or Group VIII metal on a porous support and having greater than 50% TPV in pores of 30–80 Å, less than 4% TPV in pores having diameters 200–2000 Å, and at least 3% TPV in pores having diameters greater than 2000 Å.

U.S. Pat. No. 3,692,698 (Riley et al.) discloses a catalyst useful in hydroprocessing of heavy feedstocks, the catalyst comprising a mixture of Group VI-B and Group VIII metals on a porous support and having a pore size distribution such that a major portion of its TPV is in pores of diameters ranging from 30–80 Å, less than 4% TPV is in pores of diameters of 200–2000 Å, and at least 3% TPV is in pores of diameters greater than 2000 Å.

U.S. Pat. No. 4,746,419 (Peck et al) discloses catalyst compositions characterized by the presence of 0.1–0.3 cc/g of its pore volume in pores having diameter greater than 1200 Å and no more than 0.1 cc/g of its pore volume in pores having diameter greater than 4000 Å.

Early petroleum distillate hydrotreating catalysts generally were monomodal catalysts with very small micropore diameters (less than about 100 Å) and rather broad pore size distributions. First generation petroleum resid hydrotreating catalysts were developed by introducing a large amount of macroporosity into a distillate hydrotreating catalyst pore structure to overcome the diffusion resistance of large molecules. Such catalysts, which are considered fully bimodal HDS/HDM catalysts, are typified by U.S. Pat. Nos. 4,395,328 and 4,089,774, supra.

Another approach to developing improved catalysts for petroleum resid processing has involved enlarging the micropore diameters of essentially monomodal catalysts (having no significant macroporosities) to overcome the above described diffusion limitations. Essentially monomodal catalysts with small micropore diameters and low macroporosities designed for improved petroleum resid HDS include those disclosed in U.S. Pat. Nos. 4,738,944; 4,652,545; 4,341,625; 4,309,278; 4,305,965; 4,297,242; 4,066,574; 4,051,021; 4,048,060 (1st stage catalyst); 3,770,617; and 3,692,698, supra. Essentially monomodal catalysts with larger micropore diameters and low macroporosities designed for improved petroleum resid HDM include those disclosed in U.S. Pat. Nos. 4,328,127; 4,309,278; 4,082,695; 4,048,060 (2nd stage catalyst); and 3,876,523, supra.

A recent approach to developing improved catalysts for petroleum resid processing has involved the use of catalysts having micropore diameters intermediate between the above described monomodal HDS and HDM catalysts, as well as sufficient macroporosities so as to overcome the diffusion limitations for petroleum bottoms HDS (i.e., sulfur removal from hydrocarbon product of a hydrotreated petroleum resid having a boiling point greater than 1000° F.) but limited macroporosities to limit poisoning of the interiors of the catalyst particles. Catalysts, with micropore diameters intermediate between the above-described monomodal HDS and HDM catalysts with limited macroporosities include those U.S. Pat. Nos. 4,941,964 and 5,047,142, supra.

However, none of the above-identified catalyst types has been found to be effective for achieving desired levels of hydroconversion of feedstock components having a boiling point greater than 1000° F. to products having a boiling point less than 1000° F. while simultaneously yielding a 1000° F.+ product having a lower sulfur content.

It is a particular feature of the prior art, however, that it has not heretofore been possible to carry out hydrotreating of such feedstocks to attain desirable results as measured by conversion without undesirable formation of sediment. The charge to hydrotreating is typically characterized by a very low sediment content of 0.01 w % max.

Sediment is typically measured by testing a sample by the Shell Hot Filtration Solids Test (SHFST). See Jour. Inst. Pet. (1951) 37 pages (596–604) by Van Kerknoort et al., incorporated herein by reference. Typical prior art hydro-treating processes commonly yield Shell Hot Filtration Solids SHFS of above about 0.19 w % and as high as about 1 w % in the 650° F.± product recovered from the bottoms flash drum (BFD). Production of large amounts of sediment is undesirable in that it results in deposition in downstream units which in due course must be removed. This of course requires that the unit be shut down for an undesirably long period of time.

STATEMENT OF THE INVENTION

In accordance with certain of its aspects, this invention is directed to catalysts useful for hydroprocessing a charge hydrocarbon feed containing components boiling above 1000° F., and sulfur, metals, and carbon residue which comprises:

Contacting said charge hydrocarbon feed with hydrogen at isothermal hydroprocessing conditions in the presence of a catalyst which comprises 1.1–6 w % of a Group VIII metal oxide, 5–24 w % of a Group VI-B metal oxide, and 0–2 w % of a phosphorus oxide, said catalyst being prepared by mulling the catalytic metals as salts with an alumina powder in a mulling step followed by extrusion and calcination in such a manner that less than 5% of the Group VIII metal oxide contained in the catalyst is in an acid extractable form and said catalyst having a Total Surface Area of 165–230 m$^2$/g, a Total Pore Volume of 0.81–0.98 cc/g, and a Pore Diameter Distribution whereby 22.0–36.0% of the Total Pore Volume is present as macropores of diameter greater than 250 Å, 64.0–78.0% of the Total Pore Volume is present as micropores of diameter less than 250 Å, greater than 60% of the micropore volume is present as micropores of diameter 25 Å about a pore mode by volume of 100–120 Å, less than 0.05 cc/g of micropore volume is present in micropores with diameters less than 80 Å, thereby forming hydroprocessed product containing a decreased content of components boiling above 1000° F. and a decreased content of sulfur, metals, and carbon residue; and recovering said hydroprocessed product, the hydroprocessed product containing a decreased content of sediment in the portion of the hydroprocessed product boiling above 650° F.

Suitable salts that can be used include ammonium salts such as ammonium molybdate and salts of nitric acid such as nickel nitrate. Acids that can be used include phosphoric acid, nitric acid and acetic acid.

CATALYST PROPERTIES

In general, the catalysts comprise 1.1–6 w % of a Group VIII metal oxide, 5–24 w % of a Group VI-B metal oxide, and 0–2 w % of a phosphorus oxide. Metal loadings are described in greater detail in the following table. Note that while silica and phosphorus oxide are both allowed in the Broad Range, these two catalyst components are severely restricted in the Preferred Range:

| Metal Oxide | E.G. | Broad Range | Preferred Range |
|---|---|---|---|
| Group VIII oxide | NiO | 1.1–6 | 3.0–3.5 |
| Group VI-B oxide | MoO$_3$ | 5–24 | 12.5–16.5 |
| P$_2$O$_5$ | P$_2$O$_5$ | 0–2 | <0.1 |
| SiO$_2$ | SiO$_2$ | <2.5 | <0.5 |

The catalysts of the present invention differ from prior art catalysts in respect of the volume of pores having a diameter of more than 600 Angstroms.

| | Approx. Instant Invention | Versus Reference (as noted . . . ) |
|---|---|---|
| PV, % TPV >600 Å | 15–25 | Le Page (US 4,395,328) 35–55% |
| PV, cc/g >1200 Å | 0.10–0.15 | Clark (US 5,221,656) 0.23–0.31 |
| PV, % TPV 55–115 Å | 15–40 | (US 5,514,273) 50–62.8% |

THE PROCESS OF THE PRESENT INVENTION

Typical charge hydrocarbon feeds which may be charged to the process of this invention may include:

heavy, high boiling petroleum cuts typified by gas oils, vacuum gas oils, petroleum cokes, residual oils, vacuum resid, etc. The process of this invention is particularly useful to treat high boiling oils which contain components boiling above 1000° F. to convert them to products boiling below 1000° F. The charge may be a petroleleum fraction having an initial boiling point of above 650° F. characterized by presence of an undesirable high content of components boiling above 1000° F., and sulfur, carbon residue and metals; and such charge may be subjected to hydrodesulfurization (HDS).

It is a particular feature of the process of this invention that it may permit treating of hydrocarbon charge stocks, particularly those containing components boiling above about 1000° F., to form product which is characterized by an increased content of components boiling below 1000° F. and by a decreased content of undesirable components typified by sulfur, metals, and carbon residue. It is another feature of the process of the instant invention that it provides the above-mentioned improvements with little or no sediment formation as measured by the Existent IP Sediment values of the 650° F.+ boiling point product. It is another feature of the process of the instant invention that it allows operations at higher temperatures and subsequent higher levels of 1000° F.+ to 1000° F.− than may be achieved with the use of first generation catalysts prior art catalysts.

In general, the reaction may be carried out in one or more continuously stirred tank reactors (CSTR's) in which the catalyst is exposed to a uniform quality of feed.

In practice of the process of this invention in a single stage, the charge hydrocarbon feed is contacted with hydrogen at isothermal hydrotreating conditions in the presence of the catalyst at a pressure of 1500–10,000 psig, preferably 1800–2500 psig, e.g. 2250 psig. Hydrogen is charged to the reactor at a rate of 2000–10,000 SCFB, preferably 3000–8000, e.g. 7000 SCFB. The Liquid Hourly Space Velocity (LHSV) is typically 0.1–1.5, e.g. 0.56 volumes of oil per hour per volume of liquid hold-up in the reactor. The temperature of operation is typically 700–900° F., preferably 750–875° F., e.g. 770° F. The operation is essentially isothermal. The temperature may typically vary throughout the bed by less than about 20° F.

A typical charge which may be utilized is an Arabian Medium/Heavy Vacuum Resid having the following properties:

| Property | Value |
|---|---|
| API Gravity | 4.8 |
| 1000° F.+, Vol. % | 87.5 |

-continued

| Property | Value |
|---|---|
| 1000° F.+, wt. % | 88.5 |
| 1000° F.− w % | 11.5 |
| Sulfur, w % | 5.0 |
| Total Nitrogen, wpm | 4480 |
| Hydrogen, w % | 10.27 |
| Carbon, w % | 84.26 |
| Alcor MCR, w % | 22.2 |
| Kinematic Viscosity, cSt | |
| @ 212° F. | 2430 |
| @ 250° F. | 410 |
| @ 300° F. | 117 |
| Pour Point, ° F. | 110 |
| n-$C_5$ Insolubles, w % | 28.4 |
| n-$C_7$ Insolubles, w % | 9.96 |
| Toluene Insolubles, w % | 0.02 |
| Asphaltenes, w % | 9.94 |
| Metals, wppm | |
| Ni | 49 |
| V | 134 |
| Fe | 10 |
| Cu | 3 |
| Na | 49 |
| Total Metals wpm | 245 |
| Chloride, wpm | 28 |

In another more preferred embodiment of the process of the instant invention, the liquid and gaseous effluent from the reactor is routed to a second-stage reactor containing the same weight of catalyst as had been loaded to the first reactor and which is operated at essentially the same temperature and pressure as the first-stage reactor. The difference in average temperature between the first- and second-stage reactors is 0° F.–30° F., preferably 0° F.–15° F., e.g. 0° F. No additional hydrogen is required. The liquid effluent passes through the second-stage reactor at a similar LHSV to that of the first-stage reactor. The liquid effluent from the first-stage reactor is uniformly contacted with the hydrogen-containing gaseous effluent at isothermal conditions in the second-stage reactor. No attempt is made to maintain constant catalytic activity by periodic or continuous withdrawal of portions of used catalyst and replacement of the withdrawn material with fresh catalyst in the two-stage reactor system. The catalyst begins as fresh catalyst and accumulates catalyst age generally expressed in barrels per pound. The average temperature is defined as the average of the temperatures of the first and second-stage reactors. Average temperature of operation is typically 700–900° F., preferably 750–875° F., e.g. 770° F. Overall, the hydrocarbon charge passes through the entire process system (i.e., the first and second-stage reactors) at an overall LHSV of 0.05–0.75, e.g. 0.28 volumes of oil per hour per volume of liquid hold-up in the reactor.

In one particularly preferred embodiment of the process of the instant invention, a sulfur and metal-containing hydrocarbon feedstock is catalytically hydroprocessed using an ebullated bed process for the catalytic hydrogenation of residua and heavy oils to produce upgraded distillate petroleum products and an unconverted bottoms product particularly suited for blending to a low sulfur fuel oil. The ebullated bed system operates under essentially isothermal conditions and allows for exposure of catalyst particles to a uniform quality of feed.

In the ebullated bed process a catalyst is contacted with hydrogen and a sulfur and metal-containing hydrocarbon feedstock by means which insure that the catalyst is maintained at essentially isothermal conditions and exposed to a uniform quality of feed. Preferred means for achieving such contact include contacting the feed with hydrogen and the catalyst in a single ebullated bed reactor, or in a series of 2–5 ebullated bed reactors, with a series of two ebullated bed reactors being particularly preferred. This hydroprocessing process is particularly effective in achieving high levels of hydrodesulfurization with vacuum residua feedstocks.

In the ebullated bed process, the hydrocarbon charge is admitted to the first stage of a two stage ebullated bed unit in the liquid phase at 650° F.–850° F., preferably 700° F.–825° F., and 1000–3500 psia, preferably 1500–3000 psia. Hydrogen gas is admitted to the first stage reactor of a two stage ebullated bed unit in amount of 2000–10,000 SCFB, preferably 3000–8000 SCFB. The hydrocarbon charge passes through the first stage ebullated bed reactor at a LHSV of 0.16–3.0 $hr^{-i}$, preferably 0.22 $hr^{-1}$. During operation, the catalyst bed is expanded to form an ebullated bed with a defined upper level. Operation is essentially isothermal with a typical maximum temperature difference between the inlet and outlet of 0° F.–50° F., preferably 0° F.–30° F. The liquid and gaseous effluent from the first stage reactor is then routed to the second stage reactor of the two stage unit which is operated at essentially the same temperature and pressure as the first stage reactor. The difference in average temperature between the first and second stage reactors is 0° F.–30° F., preferably 0° F.–15° F. Some additional hydrogen may optionally be injected to the second stage reactor to make up for the hydrogen consumed by reactions in the first stage reactor.

In the ebullated bed process, constant catalytic activity is maintained by periodic or continuous withdrawal of portions of used catalyst and replacement of the withdrawn material with fresh catalyst. Fresh catalyst is typically added at the rate of 0.05–1.0 pounds per barrel of fresh feed, preferably 0.20–0.40 pounds per barrel of fresh feed. An equal volume of used catalyst is withdrawn and discarded to maintain a constant inventory of catalyst on the volume basis. The catalyst replacement is performed such that equal amounts of fresh catalyst are added to the first stage reactor and the second stage reactor of a two stage ebullated bed unit.

BEST KNOWN MODE REACTOR DATA

Equal amounts of catalyst are placed within the reaction vessels (the first-stage and second-stage reactors). The hydrocarbon charge is admitted in liquid phase to the first-stage reactor at 760° F. and 2250 psig. Hydrogen gas is admitted to the first-stage reactor in the amount of 7000 SCFB. The hydrocarbon charge passes through the first-stage reactor at a Liquid Hourly Space Velocity (LHSV) of 0.56 volumes of oil per hour per volume of liquid hold up. This is equivalent to a Catalyst Space Velocity (CSV) of 0.130 barrels of hydrocarbon charge per pound of catalyst per day. The hydrocarbon feed is uniformly contacted with hydrogen and catalyst at isothermal conditions in the first-stage reactor. The liquid and gaseous effluent from the first-stage reactor is then routed to the second-stage reactor which is operated at essentially the same temperature and pressure as the first-stage reactor. The difference in average temperature between the first and second stage reactors is nominally 0° F. No additional hydrogen is injected to the second-stage reactor. The liquid effluent passes through the second-stage reactor at a Liquid Hourly Space Velocity (LHSV) of 0.56 volumes of liquid effluent per hour per volume of liquid hold up. This is equivalent to a Catalyst Space Velocity (CSV) of 0.130 barrels of liquid effluent per pound of catalyst per day. The liquid effluent from the first-stage reactor is uniformly contacted with the hydrogen-containing gaseous effluent and the second loading of catalyst at isothermal conditions in the second-stage reactor. No attempt is made to maintain constant catalytic activity by periodic or continuous withdrawal of portions of used catalyst and replacement of the withdrawn material with fresh catalyst in the two-stage reactor system. The catalyst begins as fresh catalyst and accumulates catalyst age generally expressed in barrels per pound. The average temperature is defined as the average of the temperatures of the first and second-stage reactors. Overall, the hydrocarbon charge passes through the entire process system (i.e., the first and second-stage Robinson reactors) at an overall LHSV of 0.28 volumes of oil per hour per volume of liquid hold up. This is equivalent to an overall CSV of 0.065 barrels of hydrocarbon charge per pound of catalyst per day. As will be discussed below, the temperatures of the first and second-stage reactors may be raised to higher levels with the catalyst of the instant invention.

Product is first collected and analyzed over a range of catalyst age of 0.1 through 0.4 barrels per pound (corresponding approximately to the 2nd through 6th days of the evaluation) to yield the following averaged data:

TABLE 1

| Property | Value |
| --- | --- |
| % Sulfur Removal | 82.4 |
| % Carbon Residue Reduction | 66.5 |
| % Ni Removal | 90.2 |
| % V Removal | 97.2 |
| % Hydroconversion of 1000° F.+ to 1000° F. - Materials (w % Basis) | 47.0 |
| % Kinetically Adjusted (to 0.0650 bbl/lb/day and 760.0° F.) Hydroconversion of 1000° F.+ to 1000° F. - Materials (w % Basis) | 47.3 |

From the above Table, it is apparent that the process of the instant invention permits increasing the conversion of materials boiling above 1000° F. by 47.0; and sulfur, carbon residue, and metals are removed.

Upon distillation to recover (i) a first cut from the initial boiling point to 650° F., (ii) a second cut form 650° F. to 1000° F., and (iii) a third cut above 1000° F., the following is noted:

TABLE 2

| EXAMPLE I | |
| --- | --- |
| | Product |
| Cut 1: up to 650° F. | |
| Specific Gravity, g/cc | 0.84 |
| Sulfur, w % | 0.1 |
| Cut 2: 650° F.–1000° F. | |
| Specific Gravity, g/cc | 0.93 |
| Sulfur, w % | 0.6 |
| Cut 3: 1000+° F. | |
| Specific Gravity, 9/cc | 1.01 |
| Sulfur, w % | 1.5 |

From the above Table, it is apparent that the Sulfur content is decreased in all of the product fractions (from 5.1 w % in the feed). Upon distillation to recover (iv) a cut which boils at temperatures of about 650° F. and higher, the following is noted:

TABLE 3

EXAMPLE I

| | Product |
|---|---|
| Cut 1: 650° F.+ | |
| Existent IP Sediment, w % | 0.01 |
| Accelerated IP Sediment, w % | 0.00 |

From the above Table, it is apparent that the process of the instant invention can operate at about 47.0 w % conversion of feed components with boiling points greater than 1000° F. to products with boiling points less than 1000° F. without making any appreciable sediment.

Product is next collected and analyzed over a range of catalyst age of 0.47 through 1.21 barrels per pound (corresponding approximately to the 7th through 18th days of the evaluation) to yield the following averaged data:

TABLE 4

| Property | Value |
|---|---|
| % Sulfur Removal | 79.6 |
| % Carbon Residue Reduction | 59.4 |
| % Ni Removal | 75.4 |
| % V Removal | 95.0 |
| % Hydroconversion of 1000° F+ to 1000° F. - Materials (w % Basis) | 50.0 |
| % Kinetically Adjusted (to 0.0650 bbl/lb/day and 760.0° F.) Hydroconversion of 1000° F.+ to 1000° F. - Materials (w % Basis) | 50.3 |

From the above Table, it is apparent that the process of the instant invention permits increasing the conversion of materials boiling above 1000° F. by 50.0 w %; and sulfur, carbon residue, and metals are removed.

Upon distillation to recover (i) a first cut from the initial boiling point to 650° F., (ii) a second cut from 650° F. to 1000° F., and (iii) a third cut above 1000° F., the following is noted:

TABLE 5

EXAMPLE I

| | Product |
|---|---|
| Cut 1: up to 650° F. | |
| Specific Gravity, g/cc | 0.84 |
| Sulfur, w % | 0.1 |
| Cut 2: 650° F.–1000° F. | |
| Specific Gravity, g/cc | 0.93 |
| Sulfur, w % | 0.6 |
| Cut 3: 1000° F.+ | |
| Specific Gravity, g/cc | 1.01 |
| Sulfur, w % | 1.7 |

From the above Table, it is apparent that the sulfur content is decreased in all of the product fractions (from 5.1 w % in the feed). Upon distillation to recover (iv), a cut which boils at temperatures of about 650° F. and higher, the following is noted:

TABLE 6

EXAMPLE I

| | Product |
|---|---|
| Cut 4: 650° F.+ | |
| Existent IP Sediment, w % | 0.00 |
| Accelerated IP Sediment, w % | 0.02 |

From the above Table, it is apparent that the process of the instant invention can operate at about 50.0 w % conversion of feed components with boiling points greater than 1000° F. to produce products with boiling points less than 1000° F. without making any appreciable sediment. As will be discussed below, the temperatures of the first and second-stage reactors may be raised to higher levels with the catalyst of the instant invention.

COMPARISON TO FIRST GENERATION CATALYST

The overall outline of the evaluation of the best known mode of the instant invention is as follows:

PART A: Initial activity at 760° F.

PART B: Longer-term activity at 760° F.

PART C: Activity at 770° F.

PART D: Activity at 780° F.

The first generation catalyst run was over the same time frame (and values of catalyst age) but was conducted only at 760° F.

PART A: INITIAL ACTIVITY DATA AT A VERY YOUNG CATALYST AGE (DAYS 2 TO 6):

Comparative data between the catalyst of the instant invention and a first generation NiMo catalyst (Criterion HDS-1443B), was collected under virtually identical reactor conditions, and at the very young catalyst age of 0.1 through 0.4 barrels per pound (corresponding approximately to the 2nd through 6th days of the evaluation), and the results are given in Table I (attached). The process of the instant invention is superior in that it gives:

(i) No sediment versus a very high level with the Criterion HDS-1443B NiMo catalyst; and (ii) Improved levels of carbon residue reduction and nickel and vanadium removal.

It was noted that a substantially lower level of 1000° F.+to 1000° F.– w % conversion is obtained with the catalyst of the instant invention even once the data from both catalysts are kinetically adjusted to the target CSV and temperature at catalyst ages of 0.1 through 0.4 barrels per pound.

It was also noted that a lower level of sulfur removal was seen in the observed hydrodesulfurization (HDS) of the total liquid product, as was also obtained with the catalyst of the instant invention at catalyst ages of 0.1 through 0.4 barrels per pound. Sulfur levels in all three fractionated cuts from the process of the instant invention are within +/−0.1 w % sulfur of the values obtained with the use of the first generation catalyst.

PART B: DATA AT OLDER CATALYST AGES (ABOUT DAYS 7 TO 18):

Comparative data between the catalyst of the instant invention and a first generation NiMo catalyst (Criterion HDS-1443B), collected under virtually identical reactor conditions, and at the catalyst age of 0.46 through 1.22 barrels per pound (corresponding approximately to the 7th through 18th days of the evaluation), are given in Table II (attached). Note that we have now provided Example III, a less preferred catalyst of the instant invention (less preferred because the catalyst of Example III had a lesser crush strength as discussed in the B-3 CATALYST PROPERTIES, supra). The process of the instant invention is superior in that it gives:

(i) No sediment versus a very high level with the Criterion HDS-1443B NiMo catalyst; and (ii) Improved levels of carbon residue reduction and nickel and vanadium removal.

In addition, at the older catalyst ages (0.46–1.22 barrels per pound), the process of the instant invention is superior in that it gives:

(iii) An improved level of sulfur removal as seen in the observed hydrodesulfurization (HDS) of the total liquid product; and a substantially improved, lower level of sulfur in the unconverted 1000° F.+ stream.

It was still noted that a substantially lower level of 1000° F.+ to 1000° F.– w % conversion is obtained with the catalyst of the instant invention even once the data from both catalysts are kinetically adjusted to the target CSV and temperature at catalyst ages of 0.46 through 1.22 barrels per pound.

DATA AT HIGHER TEMPERATURES
PART-C: NOMINAL +10° F.

At this point in the evaluation of the catalysts of the instant invention, reactor temperatures were raised about 10° F. over a period of three days to a final temperature of approximately 770° F. (i.e., the first-stage, second-stage, and average temperatures). Product was collected and analyzed over a range of catalyst age of 1.58 through 2.19 barrels per pound (corresponding approximately to the 24th through 32nd days of the evaluation). Comparative data between the catalysts of the instant invention operating at about +10° F. compared to the first generation NiMo catalyst (Criterion HDS-1443B) at the same catalyst ages are given in Table III (attached). The process of the instant invention is superior in that it gives:

(i) Low sediment at 55.6–59.1 w % 1000° F+ to 1000° F.– conversion versus a very high level with the Criterion HDS-1443B NiMo catalyst operating at only 53 w % 1000° F.+ to 1000° F.– conversion;

(ii) An improved level of 1000° F.+ to 1000° F.– w % conversion by the observed data and once the data from both catalysts are kinetically adjusted to the target CSV;

(iii) Improved levels of carbon residue reduction and nickel and vanadium removal; and (iv) An improved level of sulfur removal as seen in the observed hydrodesulfurization (HDS) of the total liquid product; and the substantially improved, lower level of sulfur in the unconverted 1000° F.+ stream.

PART-D: NOMINAL +20° F.

At this point in the evaluation of the catalysts of the instant invention, reactor temperatures were raised an additional 10° F. over a period of three days to a final temperature of approximately 780° F. (i.e., the first-stage, second-stage, and average temperatures). Product was collected and analyzed over a range of catalyst age of 2.50 through 2.70 barrels per pound (corresponding approximately to the 38th through 41st days of the evaluation). Comparative data between the catalysts of the instant invention operating at about +20° F. compared to the first generation NiMo catalyst (Criterion HDS-1443B) at the same catalyst ages are given in Table IV (attached). The process of the instant invention is superior in that it gives:

(i) Only slightly higher Existent IP sediment and lower Accelerated IP Sediment at 67.3–69.9 w % 1000° F.+ to 1000° F–; conversion versus that observed with the Criterion HDS-1443B NiMo catalyst operating at only 52 w % 1000° F.+ to 1000° F.– conversion;

(ii) An improved level of 1000° F.+ to 1000° F.– w % conversion by the observed data and once the data from both catalysts are kinetically adjusted to the target CSV;

(iii) Improved levels of carbon residue reduction and nickel and vanadium removal; and (iv) An improved level of sulfur removal as seen in the observed hydrodesulfurization (HDS) of the total liquid product; and the substantially improved, lower level of sulfur in the unconverted 1000° F.+ stream.

It was noted that the sulfur levels for the converted up-to-650° F. streams were slightly higher with the catalysts of the instant invention operating at about +20° F. compared to the level obtained with the first generation catalyst when both were at catalyst ages of 2.50 through 2.70 barrels per pound. It was also noted that the sulfur level for the converted 650° F.–1000° F. stream was slightly higher with the Example III catalyst operating at about +20° F. compared to the level obtained with the first generation catalyst when both were at catalyst ages of 2.50 through 2.70 barrels per pound.

OVERALL COMMENTS ON OPERABILITY

The catalysts of the instant invention, showed good operability. The evaluation went very smooth at 760° F., 770° F., and 780° F. The end of the runs represented the absolute highest conversion levels that we had ever successfully run in the two-stage reactor. For Example I, the ~+20° F. portion of the run lasted about nine days and lined-out data were collected on the last eight days. The excellent operability does not mean that the catalyst of the instant invention could run indefinitely at ~+20° F. high temperatures (corresponding to ~+15 w % 1000° F.+ to 1000° F.– bp conversion) compared to the HDS-1443B catalyst. The run terminated due to problems in the recovery section.

By contrast, the first generation catalyst evaluation showed evidence of plugging due to accumulated sediment early in the course of the run. Operations became somewhat erratic at about 1.54 bbl/pound catalyst age and the unit had to be shut down and partially cleaned out before we could complete the evaluation of the first generation catalyst (this represented the same age at which we were first able to raise temperature on the catalyst of the instant invention with no trouble). Additional plugging incidents (presumably caused by high sedimentation) occurred at ~3 and ~3.5 bbl/lb catalyst age thereby terminating the evaluation of the first generation HDS-1443B catalyst. Note again, that the entire evaluation of the first generation HDS-1443B catalyst was performed at a relatively low temperature (760° F.) and a relatively low level of 1000° F.+ to 1000° F– bp conversion (~52 to 53 w %; the exception being the very first initial activity of ~54.6 w %). With so much operability trouble, it was felt that temperatures could not be raised any higher with the first generation HDS-1443B catalyst.

COMPARISON TO CATALYSTS OF U.S. Pat. No. 5,435,908

(1) Comparison for PART-A (Initial Activity):

Limited, comparative data between the best known mode catalyst of the instant invention (Example I), a less preferred catalyst of the instant invention (Example III), a i first generation NiMo catalyst (Criterion HDS-1443B), and the best known mode catalyst of U.S. Pat. No. 5,435,908 (Comparative Example), collected under virtually identical reactor conditions (with the exception that Example III and Comparative Example are run at 10° F. lower reactor temperature), are given in Table V (attached). Note that:

(i) No sediment is found for Examples I, III, and Comparative Example versus a very high level with the Criterion HDS-1443B NiMo catalyst;

(ii) A much lower level of 1000° F.+ to 1000° F.– w % conversion is obtained with Examples I, III, and Comparative Example even once the data from all of the catalysts are kinetically adjusted to the target CSV at catalyst ages of 0.1 through 0.4 barrels per pound; and (iii) Comparative Example appears to have the lowest values for sulfur in the converted up-to-650° F., converted 650° F.–1000° F., and converted 1000° F.+ streams. Thus, Comparative Example appears to have an initial activity edge over the catalysts of the instant invention.

Due to the differences in temperature in the early phases of these evaluations, it is perhaps difficult to interpret the data. Subsequent data tables will allow for a more exact comparison.

(2) Comparison for PART-B: (Longer-term activity at 760° F.) NOTE: THIS AMOUNTS TO A TRUE COMPARISON OF THE CATALYSTS OF THE INSTANT INVENTION WITH THOSE OF U.S. Pat. No. 5,435,908 BECAUSE THE EVALUATION REACTOR CONDITIONS WERE VIRTUALLY IDENTICAL.

Limited, comparative data between the best known mode catalyst of the instant invention (Example I), a less preferred catalyst of the instant invention (Example III), a first generation NiMo catalyst (Criterion HDS-1443B), and the best known mode catalyst of U.S. Pat. No. 5,435,908 (Comparative Example), collected under virtually identical reactor conditions, are given in Table VI (attached). Note that:

(i) No sediment is found for Examples I, III, and Comparative Example versus a very high level with the Criterion HDS-1443B NiMo catalyst;

(ii) A lower level of 1000° F.+ to 1000° F.– w % conversion is obtained with Examples I, III, and Comparative Example even once the data from all of the catalysts are kinetically adjusted to the target CSV at catalyst ages Comparative Example appears to have the same values for sulfur in the converted up-to-650° F., converted 650° F.–1000° F., and converted 1000° F.+ streams compared to the values obtained with the catalysts of the instant invention. Thus, Comparative Example appears to no longer have an initial activity edge over the catalysts of the instant invention.

(3) Comparison for PART-C: (Activity at +10° F. - - - i.e., 770° F.– for Catalysts I and III of the instant invention and Comparative Example while the first generation NiMo catalyst (Criterion HDS-1443B) is operated at 760° F.:
NOTE: THIS AGAIN AMOUNTS TO A TRUE COMPARISON OF THE CATALYSTS OF THE INSTANT INVENTION WITH THOSE OF U.S. Pat. No. 5,435,908 BECAUSE THE EVALUATION REACTOR CONDITIONS WERE VIRTUALLY IDENTICAL.

Limited, comparative data between the best known mode catalyst of the instant invention (Example I), a less preferred catalyst of the instant invention (Example III), a first generation NiMo catalyst (Criterion HDS-14433), and the best known mode catalyst of U.S. Pat. No. 5,435,908 (Comparative Example), collected under virtually identical reactor conditions (with the exception that the Criterion first generation NiMo catalyst is run at 10° F. lower reactor temperature), are given in Table VII (attached). Note that:

(i) Much less sediment is found for Examples I, III, and Comparative Example versus a very high level with the Criterion HDS-1443B NiMo catalyst;

(ii) A higher level of 1000° F.+ to 1000° F.– w % conversion is obtained with Examples I, III, and Comparative Example even once the data from all of the catalysts are kinetically adjusted to the target CSV at catalyst ages of 1.58 through 2.19 barrels per pound; and (iii) Comparative Example appears to have much higher values for sulfur in the converted up-to-650° F., converted 650° F.–1000° F., and converted 1000° F+ streams compared to the values obtained with the catalysts of the instant invention. Thus, Comparative Example is inferior to the catalysts of the instant invention at higher 1000° F+ conversion levels and older catalyst ages.

Thus one aspect of the present invention is a method of preparing a catalyst characterized by its ability to hydrotreat a charge hydrocarbon feed containing components boiling above 1000° F., and sediment-precursors, sulfur, metals, asphaltenes, carbon residue, and nitrogen. The method comprises: mulling a porous alumina powder with a salt of a Group VIII metal and with a salt of a Group VI-B metal in the presence of an acid to provide a mixture, extruding the mixture to form an extrudate, drying the extrudate and subjecting the dried extrudate to hydrothermal calcination to provide said catalyst. The Group VIII metal may be a nickel and the Group VI-B metal may be a molybdenum and the acid may be phosphoric acid, nitric acid, or acetic acid. More preferably the catalyst contains about 1.1 to about 6 w % of nickel oxide and about 5 to 24 w % of molybdenum oxide. Preferably the catalyst also contains up to about 2 w % of $P_2O_5$ and not more than about 2.5 w % of $SiO_2$.

The present invention may also be embodied by a method of preparing a catalyst characterized by its ability to hydrotreat a charge hydrocarbon feed containing components boiling above 1000° F., and sediment-formers, sulfur, metals, asphaltenes, carbon residue, and nitrogen. The present method comprises: mulling said pseudobolimite silica-alumina support with about 3 to 6 wt. % of an ammonium salt of a Group VIII metal and with about 7 to 24 wt. % of a nitric acid salt of a Group VI-B metal in the presence of an acid selected from the group consisting of phosphoric acid, nitric acid, and acetic acid to provide a mixture, extruding the mixture to form an extrudate, drying the extrudate at 250 to 275° F. and subjecting the dried extrudate to hydrothermal calcination for 0.5 to 4 hours in an atmosphere of air and steam at a temperature of about 1000° F. to 1150° F. to provide said catalyst.

Another embodiment of the present invention includes a method of preparing a catalyst characterized by its ability to hydrotreat a charge hydrocarbon feed containing components boiling above 1000° F., and sediment-formers, sulfur, metals, asphaltenes, carbon residue, and nitrogen which comprises: mulling a pseudobohmite silica-alumina support with about 2.2 to 6 w % of a non-noble salt of a Group VIII metal, with about 14.5 to 24 w % of a salt of a Group VI-B metal and 0 to 2 w % of a phosphorus oxide in the presence of an acid to provide a mixture, extruding the mixture to form an extrudate, drying the extrudate at 250 to 275° F. and subjecting the dried extrudate to hydrothermal calcination for 0.5–4 hours in an atmosphere of air and steam at a temperature of about 1000° F. to 1150° F. to provide said catalyst. The resulting catalyst has a Total Surface Area of 150 to 240 m$^2$/g, a Total Pore Volume of 0.7 to 0.98 cc/g, and a Pore Diameter Distribution whereby less than about 20% of the Total Pore Volume is present as primary micropores of diameter less than about 100 Å, at least about 34% of the Total Pore Volume is present as secondary micropores of diameter of about 100 Å to 200 Å, and about 26 to 46% of the Total Pore Volume is present as mesopores of diameter greater than or equal to 200 Å.

The present invention also encompasses a catalyst composition characterized by its ability to hydrotreat a charge hydrocarbon feed containing components boiling above 1000° F., and sediment-formers, sulfur, metals, asphaltenes, carbon residue, and nitrogen which comprises a porous alumina support having incorporated therein about 1.1 to 6 wt. % of a: Group VIII metal oxide, and about 5 to 24 wt. % of a Group VI-B metal oxide. The catalyst may be prepared by: mulling a porous alumina support with a salt of a Group VIII metal and with a salt of a Group VI-B metal in the presence of an acid to provide a mixture, extruding the mixture to form an extrudate, drying the extrudate and subjecting the dried extrudate to hydrothermal calcination to provide said catalyst: said catalyst having a Total Surface Area of 150 to 240 m$^2$/g, a Total Pore Volume of 0.7 to 0.98 cc/g, and a Pore Diameter Distribution whereby less than about 20% of the Total Pore Volume is present as primary micropores of diameter less than about 100 Å, at least about 34% of the Total Pore Volume is present as secondary micropores of diameter of about 100 Å to 200 Å, and about 26 to 46% of the Total Pore Volume is present as mesopores of diameter greater than or equal to 200 Å. Preferably the catalyst incorporates therein about 3.0 to 3.5 wt. % of a Group VIII metal oxide, and about 12.5 to 16.5 wt. % of a Group VI-B metal oxide. More preferably the group VIII oxide is nickel oxide and wherein the Group VI-B metal oxide is molybdenum oxide. Further the catalyst may also contains phosphorous pentoxide and silica. Thus in a preferred embodiment the catalyst contains about 3.0 to 3.5 wt. % of nickel oxide, about 12.5 to 16.5 wt. % of molybdenum oxide, less than about 0.1 wt. % of phosphorous pentoxide and less than about 0.15 wt. % of silica.

The present inventions further includes a process for hydrotreating a charge hydrocarbon feed containing components boiling above 1000° F., and sediment-formers, sulfur, metals, asphaltenes, carbon residue, and nitrogen. The process comprises passing said charge hydrocarbon feed and hydrogen through a reactor under isothermal hydrotreating conditions in the presence of a catalyst comprising a porous alumina support having incorporated therein about 1.1 to 6 wt. % of a Group VIII metal oxide, and about 5 to 24 wt. % of a Group VI-B metal oxide, to provide a liquid and gaseous effluent containing a hydrotreated product, and recovering said hydrotreated product containing a decreased content of components boiling above 1000° F., sediment, sulfur, metals, carbon residue, asphaltenes and nitrogen. The catalyst utilized in the process is prepared by mulling a porous alumina support with a salt of a Group VIII metal and with a salt of a Group VI-B metal in the presence of an acid to provide a mixture, extruding the mixture to form an extrudate, drying the extrudate and subjecting the dried extrudate to hydrothermal calcination to provide said catalyst. The properties of the catalyst include a Total Surface Area of 150 to 240 m$^2$/g, a Total Pore Volume of 0.7 to 0.98 cc/g, and a Pore Diameter Distribution whereby less than about 20% of the Total Pore Volume is present as primary micropores of diameter less than about 100 Å, at least about 34% of the Total Pore Volume is present as secondary micropores of diameter of about 100 Å to 200 Å, and about 26 to 46% of the Total Pore Volume is present as mesopores of diameter greater than or equal to 200 Å. Preferably the isothermal hydrotreating conditions include a pressure of about 1500 to 10,000 psig, a hydrogen charge rate of about 2000 to 10,000 SCFB, and a temperature of about 700 to 900° F. and Liquid Hourly Space Velocity (LHSV) is of 0.1 to 1.5 volumes of oil per hour per volume of liquid hold-up in the reactor. More preferably the isothermal hydrotreating conditions include a pressure of about 1,800 to 2,500 psig, a hydrogen charge rate of about 3,000 to 8,000 SCFB, a temperature of about 750 to 875° F. and Liquid Hourly Space Velocity (LHSV) is of 0.4 to 0.8 volumes of oil per hour per volume of liquid hold-up in the reactor. The method may also include a step in which the liquid and gaseous effluent from said reactor is charged to a second reactor containing the same weight of catalyst as loaded into the first said reactor and which is operated at essentially the same pressure as the first reactor, but at a temperature about 0° to about 30° F. higher than the first said reactor.

The present invention also includes a process for hydrotreating a charge hydrocarbon feed containing components boiling above 1000° F., and sediment-formers, sulfur, metals, asphaltenes, carbon residue, and nitrogen which comprises passing said charge hydrocarbon feed and hydrogen through a first ebullated bed reactor in liquid phase at a LHSV of 0.16 to 3.0 hr$^{-1}$, at 650° F. to 850° F. and 1000 to 3500 psia, admitting hydrogen to said first ebullated bed reactor in amount of 2000 to 10,000 SCFB under isothermal hydrotreating conditions in the presence of a catalyst comprising a porous alumina support having incorporated therein about 1.1 to 6 wt. % of a Group VIII metal oxide, and about 5 to 24 wt. % of a Group VI-B metal oxide, to provide a liquid and gaseous effluent containing a hydrotreated product, charging the liquid and gaseous effluent from said first ebullated bed reactor to a second reactor containing the same weight of catalyst as loaded into the first said reactor and which is operated at essentially the same pressure as the first reactor, but at a temperature about 0° to about 30° F. higher than the first said reactor to provide a second liquid effluent, and recovering said hydrotreated product containing a decreased content of components boiling above 1000° F., sediment, sulfur, metals, carbon residue, asphaltenes and nitrogen from said second effluent. The catalyst was prepared by mulling a porous alumina support with ammonium molybdate and nickel nitrate in the presence of an acid selected from the group consisting of phosphoric acid, nitric acid, and acetic acid to provide a mixture, extruding the mixture to form an extrudate, drying the extrudate and subjecting the dried extrudate to hydrothermal calcination to provide said catalyst. The catalyst has a Total Surface Area of 150 to 240 m$^2$/g, a Total Pore Volume of 0.7 to 0.98 cc/g, and a Pore Diameter Distribution whereby less than about 20% of the Total Pore Volume is present as primary micropores of diameter less than about 100 Å, at least about 34% of the Total Pore Volume is present as secondary micropores of diameter of about 100 Å to 200 Å, and about 26 to 46% of the Total Pore Volume is present as mesopores of diameter greater than or equal to 200 Å. Preferably the reaction conditions in said first ebullated bed reactor include a hydrocarbon LHSV charge rate of about 0.2 to 2 hr$^{-1}$, a temperature of about 700° F. to 825° F., a pressure of about 1500 to 3000 psia, a hydrogen charge rate of about 3000 to 8000 SCFB.

Although this invention has been illustrated by reference to specific embodiments, it will be apparent to those skilled in the art that various charges and modifications may be made which clearly fall within the scope of the invention.

TABLE I

Two-Stage Reactor Catalyst Test Results
Single-Pass, Pure Resid. No Diluent, Once Through Hydrogen
Age = 0.1 to 0.4 Barrels Per Pound

| Catalyst | Example I | Example III | 1st Generation (HDS-1443B*) |
|---|---|---|---|
| CSV (Bbl/Lb/Day) | 0.0673 | NA | 0.0616 |
| Temperature (° F.) (Average both stages) | 760.6 | NA | 759.5 |
| Cut 4: (650° F.+) | | | |
| Existent IP Sediment (w %) | 0.01 | NA | 0.20 |
| Accelerated IP Sediment (w %) | 0.00 | NA | 0.84 |
| Total Liquid Product | | | |
| % Sulfur Removal | 82.4 | NA | 84.2 |
| % Carbon Residue Reduction | 66.5 | NA | 60.9 |
| % Nickel Removal | 90.2 | NA | 72.4 |
| % Vanadium Removal | 97.2 | NA | 94.0 |
| % Hydroconversion of 1000° F.+ to 1000° F.− Materials (w %) | 47.0 | NA | 54.6 |
| Kinetically Adjusted** (CSV and T) % Hydroconversion of 1000° F.+ to 1000° F.− materials (w %) | 47.3 | NA | 53.6 |
| Cut 1: up to 650° F. | | | |
| Specific gravity (g/cc) | 0.84 | NA | 0.85 |
| Sulfur (w %) | 0.1 | NA | 0.05 |
| Cut 2: 650° F.–1000° F. | | | |
| Specific gravity (g/cc) | 0.93 | NA | 0.93 |
| Sulfur (w %) | 0.6 | NA | 0.5 |
| Cut 3: 1000° F.+ | | | |
| Specific Gravity (g/cc) | 1.01 | NA | 1.02 |
| Sulfur (w %) | 1.5 | NA | 1.6 |

*Criterion HDS-1443B NiMo Catalyst.
**1st order CSTR kinetics (assuming equal rate constants for the 1st and 2nd stage reactors); Activation Energy = 65 kcal/mole.

TABLE II

Two-Stage Reactor Catalyst Test Results
Single-Pass, Pure Resid. No Diluent, Once Through Hydrogen
Age = 0.46 to 1.22 Barrels Per Pound

| Catalyst | Example I | Example III | 1st Generation (HDS-1443B*) |
|---|---|---|---|
| CSV (Bbl/Lb/Day) | 0.0674 | 0.0661 | 0.0641 |
| Temperature (° F.) (Average both stages) | 760.7 | 759.8 | 760.7 |
| Cut 4: (650° F.+) | | | |
| Existent IP Sediment (w %) | 0.00 | 0.00 | 0.16 |
| Accelerated IP Sediment (w %) | 0.02 | 0.01 | 0.67 |
| Total Liquid Product | | | |
| % Sulfur Removal | 79.6 | 79.5 | 76.2 |
| % Carbon Residue Reduction | 59.4 | 59.5 | 53.6 |
| % Nickel Removal | 75.4 | 77.6 | 64.4 |
| % Vanadium Removal | 95.0 | 95.3 | 89.9 |
| % Hydroconversion of 1000° F.+ to 1000° F.− Materials (w %) | 50.0 | 49.4 | 53.0 |
| Kinetically Adjusted** (CSV and T) % Hydroconversion of 1000° F.+ to 1000° F.− materials (w %) | 50.3 | 50.1 | 51.8 |
| Cut 1: up to 650° F. | | | |
| Specific gravity (g/cc) | 0.84 | 0.85 | 0.84 |
| Sulfur (w %) | 0.1 | 0.1 | 0.1 |
| Cut 2: 650° F.–1000° F. | | | |
| Specific gravity (g/cc) | 0.93 | 0.93 | 0.93 |
| Sulfur (w %) | 0.6 | 0.7 | 0.7 |
| Cut 3: 1000° F.+ | | | |
| Specific Gravity (g/cc) | 1.01 | 1.02 | 1.03 |
| Sulfur (w %) | 1.7 | 1.7 | 2.2 |

*Criterion HDS-1443B NiMo catalyst.
**1st order CSTR kinetics (assuming equal rate constants for the 1st and 2nd stage reactors); Activation Energy = 65 kcal/mole.

TABLE III

Two-Stage Reactor Catalyst Test Results
Single-Pass, Pure Resid. No Diluent, Once Through Hydrogen
Age = 1.58 to 2.19 Barrels Per Pound
(We have now raised temperature ~10° F. for Examples I and III)

| Catalyst | Example I | Example III | 1st Generation (HDS-1443B*) |
|---|---|---|---|
| CSV (Bbl/Lb/Day) | 0.0660 | 0.0643 | 0.0654 |
| Temperature (° F.) (Average both stages) | 770.0 | 769.9 | 760.7 |
| Cut 4: (650° F.+) | | | |
| Existent IP Sediment (w %) | 0.08 | 0.06 | 0.13 |
| Accelerated IP Sediment (w %) | 0.29 | 0.22 | 0.41 |
| Total Liquid Product | | | |
| % Sulfur Removal | 78.0 | 77.8 | 70.7 |
| % Carbon Residue Reduction | 60.2 | 59.9 | 52.1 |
| % Nickel Removal | 74.5 | 77.8 | 62.1 |
| % Vanadium Removal | 95.3 | 95.0 | 88.0 |
| % Hydroconversion of 1000° F.+ to 1000° F.− Materials (w %) | 55.6 | 59.1 | 52.8 |

TABLE III-continued

Two-Stage Reactor Catalyst Test Results
Single-Pass, Pure Resid. No Diluent, Once Through Hydrogen
Age = 1.58 to 2.19 Barrels Per Pound
(We have now raised temperature ~10° F. for Examples I and III)

| Catalyst | Example I | Example III | 1st Generation (HDS-1443B*) |
|---|---|---|---|
| Kinetically Adjusted** (CSV Only) % Hydroconversion of 1000° F.+ to 1000° F.– materials (w %) | 56.1 | 58.8 | 53.0 |
| Cut 1: up to 650° F. | | | |
| Specific gravity (g/cc) | 0.84 | 0.85 | 0.84 |
| Sulfur (w %) | 0.1 | 0.1 | 0.2 |
| Cut 2: 650° F.–1000° F. | | | |
| Specific gravity (g/cc) | 0.93 | 0.93 | 0.92 |
| Sulfur (w %) | 0.7 | 0.8 | 0.9 |
| Cut 3: 1000° F.+ | | | |
| Specific Gravity (g/cc) | 1.03 | 1.03 | 1.04 |
| Sulfur (w %) | 1.9 | 2.0 | 2.6 |

*Criterion HDS-1443B NiMo catalyst.
**1st order CSTR kinetics (assuming equal rate constants for the 1st and 2nd stage reactors); Activation Energy = 65 kcal/mole.

TABLE IV

Two-Stage Reactor Catalyst Test Results
Single-Pass, Pure Resid. No Diluent, Once Through Hydrogen
Age = 2.50 to 2.70 Barrels Per Pound
(We have now raised temperature ~20° F. for Examples I and III)

| Catalyst | Example I | Example III | 1st Generation (HDS-1443B*) |
|---|---|---|---|
| CSV (Bbl/Lb/Day) | 0.0643 | 0.0639 | 0.0636 |
| Temperature (° F.) (Average both stages) | 780.3 | 779.1 | 759.9 |

TABLE IV-continued

Two-Stage Reactor Catalyst Test Results
Single-Pass, Pure Resid. No Diluent, Once Through Hydrogen
Age = 2.50 to 2.70 Barrels Per Pound
(We have now raised temperature ~20° F. for Examples I and III)

| Catalyst | Example I | Example III | 1st Generation (HDS-1443B*) |
|---|---|---|---|
| Cut 4: (650° F.+) | | | |
| Existent IP Sediment (w %) | 0.18 | 0.14 | 0.13 |
| Accelerated IP Sediment (w %) | 0.38 | 0.18 | 0.73 |
| Total Liquid Product | | | |
| % Sulfur Removal | 78.4 | 77.8 | 67.5 |
| % Carbon Residue Reduction | 63.8 | 65.1 | 50.3 |
| % Nickel Removal | 83.7 | 88.9 | 60.6 |
| % Vanadium Removal | 97.0 | 96.5 | 87.3 |
| % Hydroconversion of 1000° F.+ to 1000° F.– Materials (w %) | 67.3 | 69.9 | 52.0 |
| Kinetically Adjusted** (CSV Only) % Hydroconversion of 1000° F.+ to 1000° F.– materials (w %) | 67.0 | 69.4 | 51.4 |
| Cut 1: up to 650° F. | | | |
| Specific gravity (g/cc) | 0.86 | 0.85 | 0.85 |
| Sulfur (w %) | 0.3 | 0.3 | 0.2 |
| Cut 2: 650° F.–1000° F. | | | |
| Specific gravity (g/cc) | 0.93 | 0.94 | 0.93 |
| Sulfur (w %) | 0.8 | 1.2 | 1.0 |
| Cut 3: 1000° F.+ | | | |
| Specific Gravity (g/cc) | 1.05 | 1.07 | 1.04 |
| Sulfur (w %) | 2.1 | 2.4 | 2.7 |

*Criterion HDS-1443B NiMo catalyst.
**1st order CSTR kinetics (assuming equal rate constants for the 1st and 2nd stage reactors); Activation Energy = 65 kcal/mole.

TABLE V

Two-Stage Reactor Catalyst Test Results
Single-Pass, Pure Resid., No Diluent, Once Through Hydrogen
Age = 0.1 to 0.4 Barrels Per Pound

| Catalyst | Example I | Example III | 1st Generation (HDS-1443B*) | Comparative Example D #92,030 Best Mode Catalyst |
|---|---|---|---|---|
| CSV (Bbl/Lb/Day) | 0.0673 | 0.0712 | 0.0616 | 0.0661 |
| Temperature (° F.) (Average both stages) | 760.6 | 753.5 | 759.5 | 749.7 <=== NOTE |
| Cut 4: (650° F.+) | | | | |
| Existent IP Sediment (w %) | 0.01 | 0.02 | 0.20 | 0.01 |
| Accelerated IP Sediment (w %) | 0.00 | 0.01 | 0.84 | 0.00 |
| Total Liquid Product | | | | |
| % Sulfur Removal | 82.4 | 79.8 | 84.2 | 83.9 |
| % Hydroconversion of 1000° F.+ to 1000° F.– Materials (w %) | 47.0 | 45.1 | 54.6 | 42.8 |
| Kinetically Adjusted** (CSV and T) % Hydroconversion of 1000° F.+ to 1000° F.– materials (w %) | 47.3 | Too big an adjustment | 53.6 | Too big an adjustment |
| Cut 1: up to 650° F. Sulfur (w %) | 0.1 | 0.1 | 0.05 | 0.1 |
| Cut 2: 650° F.–1000° F. Sulfur (w %) | 0.6 | 0.6 | 0.5 | 0.4 |

TABLE V-continued

Two-Stage Reactor Catalyst Test Results
Single-Pass, Pure Resid., No Diluent, Once Through Hydrogen
Age = 0.1 to 0.4 Barrels Per Pound

| Catalyst | Example I | Example III | 1st Generation (HDS-1443B*) | Comparative Example D #92,030 Best Mode Catalyst |
|---|---|---|---|---|
| Cut 3: 1000° F.+ Sulfur (w %) | 1.5 | 1.6 | 1.6 | 1.3 |

*Criterion HDS-1443B NiMo catalyst.
**1st order CSTR kinetics (assuming equal rate constants for the 1st and 2nd stage reactors); Activation Energy = 65 kcal/mole.

TABLE VI

Two-Stage Reactor Catalyst Test Results
Single-Pass, Pure Resid., No Diluent, Once Through Hydrogen
Age 0.46 to 1.22 Barrels Per Pound

| Catalyst | Example I | Example III | 1st Generation (HDS-1443B*) | Comparative Example D #92,030 Best Mode Catalyst |
|---|---|---|---|---|
| CSV (Bbl/Lb/Day) | 0.0674 | 0.0661 | 0.0641 | 0.0644 |
| Temperature (° F.) (Average both stages) | 760.7 | 759.8 | 760.7 | 759.9 |
| Cut 4: (650° F.+) | | | | |
| Existent IP Sediment (w %) | 0.00 | 0.00 | 0.16 | 0.01 |
| Accelerated IP Sediment (w %) Total Liquid Product | 0.02 | 0.01 | 0.67 | 0.08 |
| % Sulfur Removal | 79.6 | 79.5 | 76.2 | 79.3 |
| % Hydroconversion of 1000° F.+ to 1000° F.− Materials (w %) | 50.0 | 49.4 | 53.0 | 48.4 |
| Kinetically Adjusted** (CSV and T) % Hydroconversion of 1000° F.+ to 1000° F.− materials (w %) | 50.3 | 50.1 | 51.8 | 48.3 |
| Cut 1: up to 650° F. Sulfur (w %) | 0.1 | 0.1 | 0.1 | 0.1 |
| Cut 2: 650° F.–1000° F. Sulfur (w %) | 0.6 | 0.7 | 0.7 | 0.6 |
| Cut 3: 1000° F.+ Sulfur (w %) | 1.7 | 1.7 | 2.2 | 1.7 |

*Criterion HDS-1443B NiMo catalyst.
**1st order CSTR kinetics (assuming equal rate constants for the 1st and 2nd stage reactors); Activation Energy = 65 kcal/mole.

TABLE VII

Two-Stage Reactor Catalyst Test Results
Single-Pass, Pure Resid., No Diluent, Once Through Hydrogen
Age = 1.58 to 2.19 Barrels Per Pound
(We have now raised tmperature ~10° F. for Examples I and III)

| Catalyst | Example I | Example III | 1st Generation (HDS-1443B*) | Comparative Example D #92,030 Best Mode Catalyst |
|---|---|---|---|---|
| CSV (Bbl/Lb/Day) | 0.0660 | 0.0643 | 0.0654 | 0.064 |
| Temperature (° F.) (Average both stages) | 770.0 | 769.9 | 760.7 | 771.15 |
| Cut 4: (650° F.+) | | | | |
| Existent IP Sediment (w %) | 0.08 | 0.06 | 0.13 | 0.08 |
| Accelerated IP Sediment (w %) Total Liquid Product | 0.29 | 0.22 | 0.41 | 0.29 |
| % Sulfur Removal | 78.0 | 77.8 | 70.7 | 76.2 |
| % Hydroconversion of 1000° F.+ to 1000° F.− Materials (w %) | 55.6 | 59.1 | 52.8 | 59.0 |

TABLE VII-continued

Two-Stage Reactor Catalyst Test Results
Single-Pass, Pure Resid., No Diluent, Once Through Hydrogen
Age = 1.58 to 2.19 Barrels Per Pound
(We have now raised tmperature ~10° F. for Examples I and III)

| Catalyst | Example I | Example III | 1st Generation (HDS-1443B*) | Comparative Example D #92,030 Best Mode Catalyst |
|---|---|---|---|---|
| Kinetically Adjusted** (CSV and T) % Hydroconversion of 1000° F.+ to 1000° F.– materials (w %) | 56.1 | 58.8 | 53.0 | 57.2 |
| Cut 1: up to 650° F. Sulfur (w %) | 0.1 | 0.1 | 0.2 | 0.2 |
| Cut 2: 650° F.–1000° F. Sulfur (w %) | 0.7 | 0.8 | 0.9 | 0.9 |
| Cut 3: 1000° F.+ Sulfur (w %) | 1.9 | 2.0 | 2.6 | 2.2 |

*Criterion HDS-1443B NiMo catalyst.
**1st order CSTR kinetics (assuming equal rate constants for the 1st and 2nd stage reactors); Activation Energy = 65 kcal/mole.

What is claimed is:

1. A method of preparing a catalyst characterized by its ability to hydrotreat a charge hydrocarbon feed containing components boiling above 1000° F. and sediment-precursors, sulfur, metals, asphaltenes, carbon residue, and nitrogen which comprises:

mulling a porous alumina powder with a salt of a Group VIII metal and with a salt of a Group VI-B metal, in an amount to provide 100% of the Group VIII and Group VI-B metal components of the final catalyst, in the presence of an acid to provide a mixture, extruding the mixture to form an extrudate, drying the extrodate and subjecting the dried extrudate to hydrothermal calcination of provide said catalyst, said catalyst having a Total Surface Area of 150 to 240 m$^2$/g and a Total Pore Volume of 0.7–0.98 cc/g.

2. A method as in claim 1 wherein the Group VIII metal is nickel and the Group VI-B metal is molybdenum and the acid is phosphoric acid, nitric acid, or acetic acid.

3. A method as in claim 2 wherein the catalyst contains about 1.1 to about 6 w % of a nickel oxide and about 5 to 24 w % of a molybdenum oxide.

4. A method as in claim 3 wherein the catalyst also contains up to about 2 w % of P$_2$O$_5$ and not more than about 2.5 w % of SiO$_2$.

5. A method of preparing a catalyst characterized by its ability to hydrotreat a charge hydrocarbon feed containing components boiling above 1000° F., and sediment-formers, sulfur, metals, asphaltenes, carbon residue, and nitrogen which comprises:

mulling a pseudobohmite silica-alumina powder with about 3 to 6 wt. % of an ammonium salt of a Group VIII metal and with about 7 to 24 wt. % of a nitric acid salt of a Group VI-B metal in the presence of an aid selected from the group consisting of phosphoric acid, nitric acid, and acetic acid to provide a mixture, extruding the mixture to form an extrudate, drying the extrudate at 250 to 275° F. and subjecting the dried extrudate to hydrothermal calcination for 0.5 to 4 hours in an atmosphere of air and steam at a temperature of about 1000° F. to 1150° F. to provide said catalyst.

6. A method of preparing a catalyst characterized by its ability to hydrotreat a charge hydrocarbon feed containing components boiling above 1000° F., and sediment-formers, sulfur, metals, asphaltenes, carbon residue, and nitrogen which comprises:

mulling a pseudobohmite silica-alumina powder with about 2.2 to 6 w % of a non-noble salt of a Group VIII metal, with about 14.5 to 24 w % of a salt of a Group VI-B metal and 0 to 2 w % of a phosphorus oxide in the presence of an acid to provide a mixture, extruding the mixture to form an extrudate, drying the extrudate at 250 to 275° F. and subjecting the dried extrudate to hydrothermal calcination for 0.5–4 hours in an atmosphere of air and steam at a temperature of about 1000° F. to 1150° F. to provide said catalyst, said catalyst having a Total Surface Area of 150 to 240 m$^2$/g a Total Pore Volume of 0.7–0.98 cc/g, and a Pore Diameter Distribution whereby less than about 20% of the Total Pore Volume is present as primary micropores of diameter less than about 100 Å, at least about 34% of the Total Pore Volume is present as secondary micropores of diameter of about 100 Å and 200 Å, and about 26 to 46% of the Total Pore Volume is present as mesopores of diameter greater than or equal to 200 Å.

7. A catalyst composition haraterized by its ability to hydrotreat a charge hydrocarbon feed containing components boiling above 1000° F., and sediment-formers, sulfur, metals, asphaltenes, carbon residue, and nitrogen which comprised a porons alumina support having incorporated therein about 1.1 to 6wt. % of a Group VIII metal oxide, and about 5 to 24 wt. % of a Group VI-B metal oxide, said catalyst having been prepared by:

mulling a porous alumina powder with a salt of a Group VIII metal oxide and with a salt of a Group VI-B metal oxide in the presence of an acid to provide a mixture, extruding the mixture to form an extrudate, drying the extrudate and subjecting the dried extrudate to hydrothermal calcination to provide said catalyst:

said catalyst having a Total Surface Area of 150 to 240 m$^2$/g, a Total Pore Volume of 0.7–0.98 cc/g, and a Pore Diameter Distribution whereby less than about 100 Å, at least about 34% of the Total Pore Volume is present as secondary micropores of diameter of about 100 Å to 200 Å, and about 26 to 46% of the Total Pore Volume is present as mesopores of diameter greater than or equal to 200 Å.

8. A catalyst as in claim 7 having incorporated therein about 3.0 to 3.5 wt. % of a Group VIII metal oxide, and about 12.5 to 16.5 wt. % of a Group VI-B metal oxide.

9. A catalyst as in claim 8 wherein the group VIII oxide is nickel oxide and wherein the Group VI-B metal oxide is molybdenum oxide.

10. A catalyst as in claim 8 wherein the catalyst also contains phosphorous pentoxide and silica.

11. A catalyst as in claim 8 wherein the catalyst contains about 3.0–3.5 wt. % of nickel oxide, about 12.5 to 16.5 wt. % of molybdenum oxide, less than about 0.1 wt. % of phosphorous pentoxide and less than about 0.15 wt. % of silica.

12. A process for hydrotreating a change hydrocarbon feed containing components boiling above 1000° F., and sediment-formers, sulfur, metals, asphaltenes, carbon residue, and nitrogen which comprises passing said charge hydrocarbon feed and hydrogen through a reactor under isothermal hydrotreating conditions in the presence of a catalyst comprising a porous alumina support having incorporated therein about 1.1 to 6 wt. % of a Group VIII metal oxide, and about 5 to 24 wt. % of a Group VI-B metal oxide, to provide a liquid and gaseous effluent containing a hydrotreated product, and recovering said hydrotreated product containing a decreased content of components boiling above 1000° F., sediment, sulfur, metals, carbon residue, asphaltenes and nitrogen, said catalyst having been prepared by mulling a porous alumina powder with a salt of a Group VIII metal oxide and with a salt of a Group VI-B metal oxide in the presence of an acid to provide a mixture, extruding the mixture to form an extrudate, drying the extrudate and subjecting the dried extrudate to hydrothermal calcination to provide said catalyst, said catalyst having a Total Surface Area of 150 to 240 m$^2$/g, a Total Pore Volume of 0.7 to 0.98 cc/g, and a Pore Diameter Distribution whereby less than about 20% of the Total Pore Volume is present as primary micropores of diameter less than about 100 Å, at least about 34% of the Total Pore Volume is present as secondary micropores of diameter of about 100 Å to 200 Å, and about 26 to 46% of the Total Pore Volume is present as mesopores of diameter greater than or equal to 200 Å.

13. A process as in claim 12 wherein the isothermal hydrotreating conditions include a pressure of about 1500 to 10,000 psig, a hydrogen charge rate of about 2000 to 10,000 SCFB, and a temperature of about 700 to 900° F. and Liquid Hourly Spae Velocity (LHSV) is of 0.1 to 1.5 volumes of oil per hour, per volume of liquid hold-up in the reactor.

14. A process as in claim 13 wherein the isothermal hydrotreating conditions include a pressure of about 1,800 to 2,500 psig, a hydrogen charge rate of about 3,000 to 8,000 SCFB, a temperature of about 750 to 875° F. and Liquid Hourly Space Velocity (LHSV) is of 0.4 to 0.8 volumes of oil per hour per volume of liquid hold-up in the reactor.

15. A method as in claim 12 wherein the liquid and gaseous effluent from said reactor is charged to a second reactor containing the same weight of catalyst as loaded into the first said reactor and which is operated at essentially the same pressure as the first reactor, but at a temperature about 0° to about 30° F. higher than the first said reactor.

16. A process for hydrotreating a charge hydrocarbon feed containing components boiling above 1000° F., and sediment-formers, sulfur, metals, asphaltenes, carbon residue, and nitrogen which comprises passing said charge hydrocarbon feed and hydrogen through a first ebullated bed reactor in liquid phase at a LHSV of 0.16 to 3.0 hr$^{-1}$, at 650° F. to 850° F. and 1000 to 3500 psia, admitting hydrogen to said first ebullated bed reactor in amount of 2000 to 10,000 SCFB under isothermal hydrotreating conditions in the presence of a catalyst comprising a porous alumina support having incorporated therein about 1.1 to 6 wt. % of Group VIII metal oxide, and about 5 to 24 wt. % of a Group VI-B metal oxide, to provide a liquid and gaseous effluent containing a hydrotreated product, charging the liquid and gaseous effluent from said first ebullated bed reactor to a second reactor containing the same weight of catalyst as loaded into the first said reactor and which is operated at essentially the same pressure as the first reactor, but at a temperature about 0° to about 30° F. higher than the first said reactor to provide a second liquid effluent, and recovering said hydrotreated product containing a decreased content of components boiling above 1000° F., sediment, sulfur, metals, carbon residue, asphaltenes and said catalyst having been prepared by nulling a porous alumina powder with ammonium molybdate and nickel nitrate in the presence of an acid selected from the group consisting of phosphoric acid, nitric acid, and acetic acid to provide a mixture, extruding the mixture to form an extrudate, drying the extrudate and subjecting the dried extrudate to hydrothermal calcination to provide said catalyst, said catalyst having a Total Surface Area of 150 to 240 m$^2$/g, a Total Pore Volume of 0.7 to 0.98 cc/g, and a Pore Diameter Distribution whereby less than about 20% of the Total Pore Volume is present as primary micropores of diameter less than about 100 Å, at least about 34% of the Total Pore Volume is present as secondary micropores of diameter of about 100 Å to 200 Å, and about 26 to 46% of the Total Pore Volume is present as mesopores of diameter greater than or equal to 200 Å.

17. A process as in claim 16 wherein the reaction conditions in said first ebullated bed reactor include a hydrocarbon LHSV charge rate of about 0.2 to 2 hr$^{-1}$, a temperature of about 700° F.–825° F., a pressure of about 1500 to 3000 psia, a hydrogen charge rate of about 3000 to 8000 SCFB.

18. A method of hydroprocessing a charge hydrocarbon feed containing components boiling above 1000°°F., and sulfur, metals, ad carbon residue, said process comprising:

contacting said charge hydrocarbon feed with hydrogen at isothermal hydroprocessing conditions in the presence of a catalyst, said catalyst comprising 1.1 to 6 w % of a Group VIII metal oxide, 5 to 24 w % of a Group VIB metal oxide, and 0 to 2 w % of a phosphorus oxide, and wherein said catalyst is prepared by mulling the catalytic metals as salts with an alumina powder under acidic conditions to give an acidic mixture followed by extrusion of the acidic mixture and calcination in such a manner so that less Ban 5% of the Group VIII metal oxide contained in the catalyst is in an acid extractable form and wherein said catalyst has a Total Surface Area of 165 to 230 m$^2$/g, a Total Pore Volume of 0.81 to 0.98 cc/g, and a Pore Diameter Distribution in which 22.0 to 36.0% of die Total Pore Volume is present as macropores of diameter greater than 250 Å, 64.0 to 78.0% of the Total Pore Volume is present as micropores of diameter less than 250 Å, greater than 60% of the incorporate volume is present as micropores of diameter 25 Å about a pore mode by volume of 100 to 120 Å, less than 0.05 cc/g of micropore volume is present in micropores with diameters less than 80 Å, thereby forming hydroprocessed product containing a decreased content of components boiling above 1000°

F. and a decreased content of sulfur, metals, and carbon residue; and recovering said hydroprocessed product, the hydroprocessed product containing a decreased content of sediment in the portion of the hydroprocessed product boiling above 650° F.

19. A catalyst composition characterized by its ability to hydrotreat a charge hydrocarbon feed containing components boiling above 1000° F., and sediment-formers, sulfur, metals, asphaltenes, carbon residue, and nitrogen, said catalyst comprising comprising 1.1 to 6 w % of a Group VIII metal oxide, 5 to 24 w % of a Group VIB metal oxide, and 0 to 2 w % of a phosphorus oxide, and wherein said catalyst is prepared by mulling the catalytic metals as salts with an alumina powder under acidic conditions to give an acidic mixture followed by extrusion of the acidic mixture and calcination in such a manner so that less than 5% of the Group VIII metal oxide contained in the catalyst is in an acid extractable form and wherein said catalyst has a Total Surface Area of 165 to 230 $m^2/g$, a Total Pore Volume of 0.81 to 0.98 cc/g, and a Pore Diameter Distribution in which 22.0 to 36.0% of the Total Pore Volume is present as macropores of diameter greater than 250 Å, 64.0 to 78.0% of the Total Pore Volume is present as micropores of diameter less than 250 Å, greater than 60% of the micropore volume is present as micropores of diameter 25 Å about a pore mode by volwme of 100 to 120 Å, less than 0.05 cc/g of rnicropore volume is present in inicropores with diameters less than 80 Å.

* * * * *